(12) United States Patent
Kent

(10) Patent No.: US 6,668,933 B2
(45) Date of Patent: Dec. 30, 2003

(54) BALL VALVE SEAT AND SUPPORT

(75) Inventor: Peter Michael Kent, Aberdeen (GB)

(73) Assignee: ABB Vetco Gray Inc., Houston, TX (US)

( * ) Notice: Subject to any disclaimer, the term of this patent is extended or adjusted under 35 U.S.C. 154(b) by 0 days.

(21) Appl. No.: 09/972,676

(22) Filed: Oct. 8, 2001

(65) Prior Publication Data

US 2002/0046842 A1 Apr. 25, 2002

Related U.S. Application Data

(60) Provisional application No. 60/242,468, filed on Oct. 23, 2000.

(51) Int. Cl.$^7$ .............................................. E21B 34/06
(52) U.S. Cl. ................. 166/334.2; 166/321; 166/332.3; 251/314; 251/315.13
(58) Field of Search ................................ 166/360, 363, 166/332.3, 334.2, 321; 251/315.13, 315.14, 317, 316, 314

(56) References Cited

U.S. PATENT DOCUMENTS

| | | | |
|---|---|---|---|
| RE25,471 E | * 11/1963 | Fredd | ........................... 251/31 |
| 4,022,178 A | * 5/1977 | Cross et al. | ................. 123/190 |
| 4,114,639 A | * 9/1978 | Cross et al. | ........... 137/246.22 |
| 5,179,973 A | 1/1993 | Dickson et al. | |
| 5,284,209 A | 2/1994 | Godfrey | |
| 5,338,001 A | 8/1994 | Godfrey et al. | |
| 5,738,336 A | 4/1998 | McKnight et al. | |
| 6,152,229 A | 11/2000 | Jennings | |

FOREIGN PATENT DOCUMENTS

| | | |
|---|---|---|
| EP | 0053983 | 6/1982 |
| EP | 0679796 A2 | 11/1995 |
| GB | 2340860 A | 3/2000 |
| WO | WO96/35857 | 11/1996 |

* cited by examiner

Primary Examiner—David Bagnell
Assistant Examiner—Giovanna M Collins
(74) Attorney, Agent, or Firm—Bracewell & Patterson, L.L.P.

(57) ABSTRACT

A ball valve assembly has a lower support, an upper seat, a spherical ball, and linkages for rotating the ball. The lower support has a spherical support surface for the ball. The lower support also has a pair of guides for maintaining alignment of the ball and seat to prevent contact with the linkages. The upper seat has a skirt with a spherical inner surface having grooves for contacting the ball. The skirt and grooves seal and ensure alignment of the ball. The grooves also assist in the retention of lubricant to reduce friction. An optional insert is located in the skirt for low pressure sealing from below and above. Finally, the skirt has a pair of openings to provide relief for the operating links, and flat structures against which the guides of the lower support may restrain rotation of the upper support.

16 Claims, 3 Drawing Sheets

BALL VALVE SEAT AND SUPPORT

This application claims the provisional application priority date of Oct. 23, 2000, Ser. No. 60/242,468.

BACKGROUND OF THE INVENTION

1. Technical Field

The present invention relates in general to an improved ball valve, and in particular to an improved valve seat and support mechanism for a ball valve.

2. Background Art

The use of in-line ball valve assemblies in subsea tree intervention tools is well known in the art. The ball valves are used to open and close a central flow passage in the assembly and are typically hydraulically actuated. In some cases, the ball valves are designed to shear coiled tubing or wireline extending through the valve in the event of an emergency.

In one type of prior art device, disclosed in U.S. Pat. No. 5,551,665, a pair of control pins slide radially inward within slots to actuate the ball between the open and closed positions. Similarly, PCT Publication No. WO 96/35857 shows and describes control pins that slide axially to accomplish the same objective. Regarding the shearing function, U.S. Pat. No. 4,160,478 illustrates a quadrant of a ball valve tool having a cutting mechanism that will cut coiled tubing in only one place. This is advantageous since a small, loose segment of tubing would otherwise be cut and remain in the assembly. The segment could then fall into the bottom of the well and create additional problems. In yet another prior art device, U.S. Pat. No. 5,284,209, describes a ball valve that shears coiled tubing in only one place due to a recess in the housing. Although all of these designs are workable, an improved ball valve assembly that provides all of the features while still providing excellent sealing capability is needed.

SUMMARY OF THE INVENTION

One embodiment of a ball valve assembly comprises a lower support, an upper seat, a spherical ball therebetween having an axial hole, and operating links for rotating the ball. The lower support has a tubular base with a spherical support surface for the ball. A recess is located in the support surface to provide relief for a wire line during cutting operations. The lower support also has a pair of guides for maintaining alignment of the ball with the supports and seat to prevent contact with the operating links.

The upper seat has a skirt with a semi-spherical inner surface that extends from the lower end of the upper portion. The inner surface of the skirt is provided with a plurality of parallel grooves for contacting an upper portion of the ball at all times. The skirt and grooves seal and ensure alignment of the ball. The grooves also assist in the retention of lubricant to reduce friction. An optional insert is located in the skirt for low pressure sealing from below and above. Finally, the skirt has a pair of openings to provide relief for the operating links, and flat structures against which the guides of the lower support may restrain rotation of the upper support.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the present invention, as well as others which will become apparent, are attained and can be understood in more detail, more particular description of the present invention briefly summarized above may be had by reference to the embodiment thereof which is illustrated in the appended drawings, which drawings form a part of this specification. It is to be noted, however, that the drawings illustrate only a preferred embodiment of the present invention and is therefore not to be considered limiting of its scope as the present invention may admit to other equally effective embodiments.

DETAILED DESCRIPTION OF THE INVENTION

Figure 1:
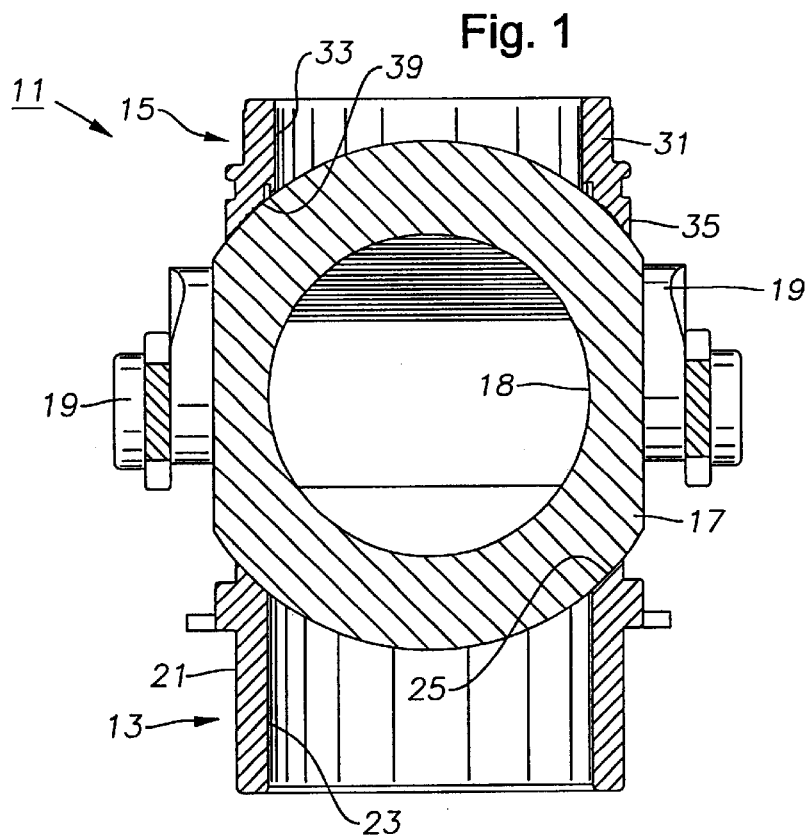
FIG. 1 is a sectional side view of a ball valve working elements sub-assembly constructed in accordance with the present invention.
Figure 2:
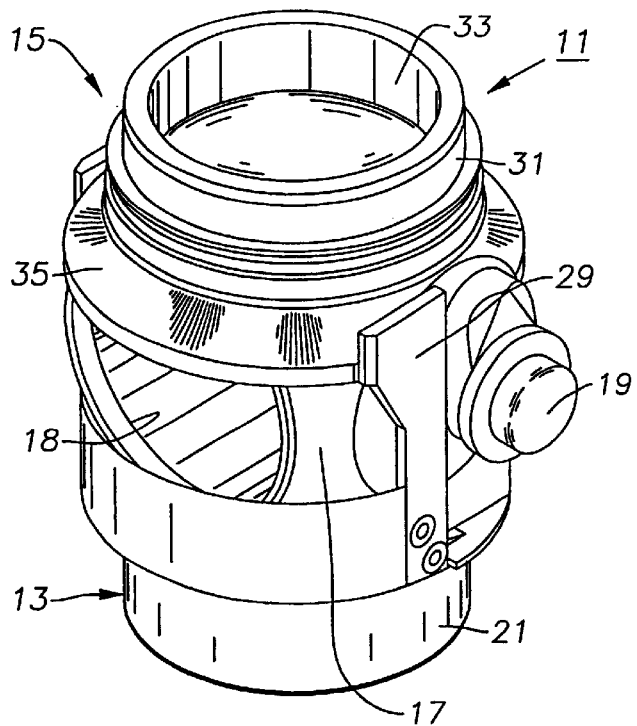
FIG. 2 is an isometric view of the ball valve working elements sub-assembly of FIG. 1.

Referring to FIGS. 1 and 2, a ball valve assembly 11 constructed in accordance with the present invention is shown. Ball valve assembly 11 comprises a lower support structure 13, an upper seat structure 15, a spherical ball 17 therebetween having an axial hole 18, and operating links 19 for rotating ball 17 relative to the other stationary components of ball valve assembly 11.

Figure 5:
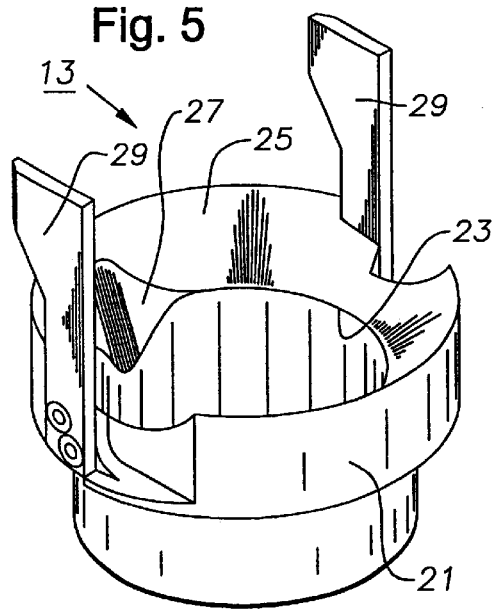
FIG. 5 is an isometric view of a lower support structure of the ball valve assembly of FIG. 1.
Figure 3:
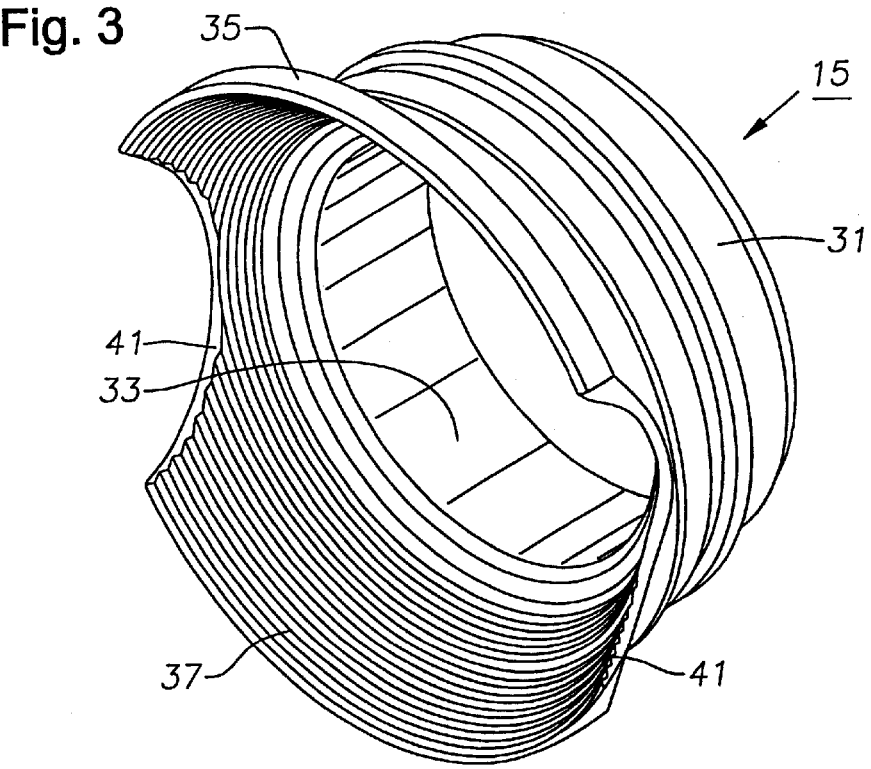
FIG. 3 is an isometric view of an upper seat element for the ball valve assembly of FIG. 1.

As shown in FIGS. 1, 2, and 5, lower support structure 13 has a generally tubular base 21 with an axial bore 23 extending therethrough, and a substantially upward-facing support surface 25 for directly contacting ball 17. Support surface 25 utilizes a semi-spherical surface to support a lower portion of ball 17 at all times, regardless of the rotational orientation of ball 17. A notch or recess 27 is located in support surface 25 to provide relief for a wire line (not shown) during cutting operations. Lower support structure 13 also has a pair of upward-extending arms or guides 29 that are located on substantially opposite sides of lower support structure 13. Guides 29 are provided for maintaining alignment of ball 17 with support 13 and seat 15 to prevent contact with operating links 19.

Figure 4:
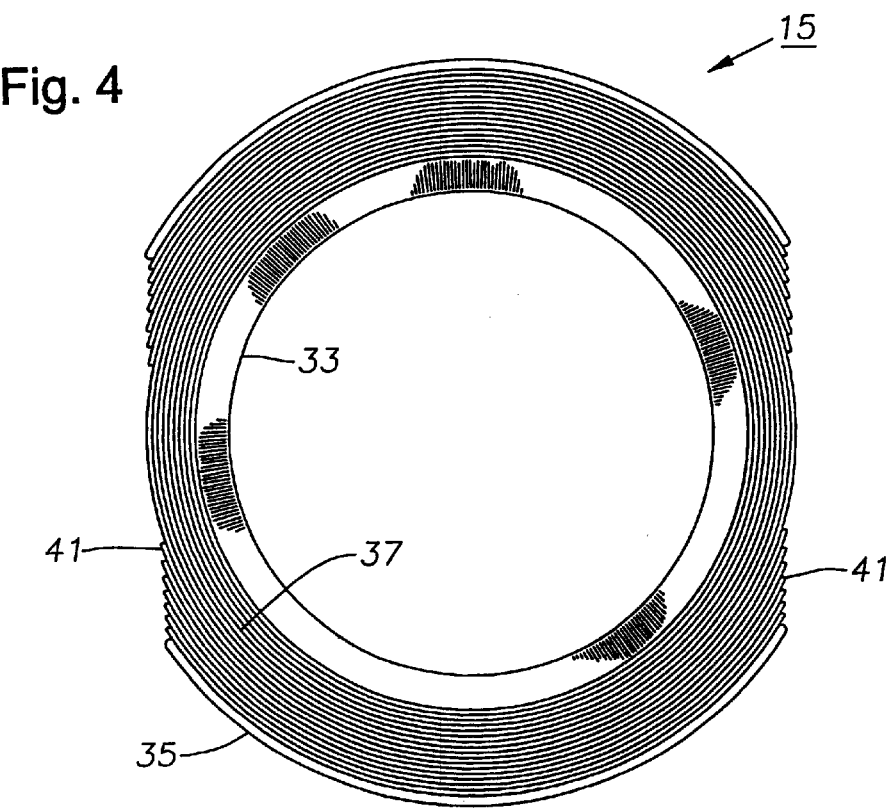
FIG. 4 is an axial bottom view of the upper seat element of FIG. 3.

Referring now to FIGS. 1–4, upper seat structure 15 comprises a generally tubular upper portion 31 having an axial bore 33 extending therethrough. A skirt 35 having a generally semi-spherical inner surface extends from the lower end of upper portion 31. Skirt 35 prevents cocking of ball 17 throughout rotation. The inner surface of skirt 35 is provided with a texture such as a plurality of parallel grooves 37 for contacting an upper portion of ball 17 at all times. Skirt 35 and grooves 37 seal and ensure alignment of ball 17 throughout its range of rotation. Grooves 37 also assist in the retention of lubricant (not shown) to reduce friction. An optional insert 39 (FIG. 1) may be provided in a groove 37 and/or the inner surface of skirt 35 for low pressure sealing from below and above. Insert 39 may be formed from a variety of materials, such as soft metallic materials. Finally, skirt 35 has a pair of substantially planar reliefs or openings 41 that are not quite parallel (FIG. 4). Openings 41 could be parallel provided the width across the reliefs is less than the width of ball 17 in line with operating links 19. They are only tapered to reduce the criticality of alignment. Openings 41 are located on opposite sides of skirt 35 to provide relief for operating links 19, and flat structures against which guides 29 of lower support structure 13 may restrain rotation of upper support structure 31 relative thereto.

Figure 6:
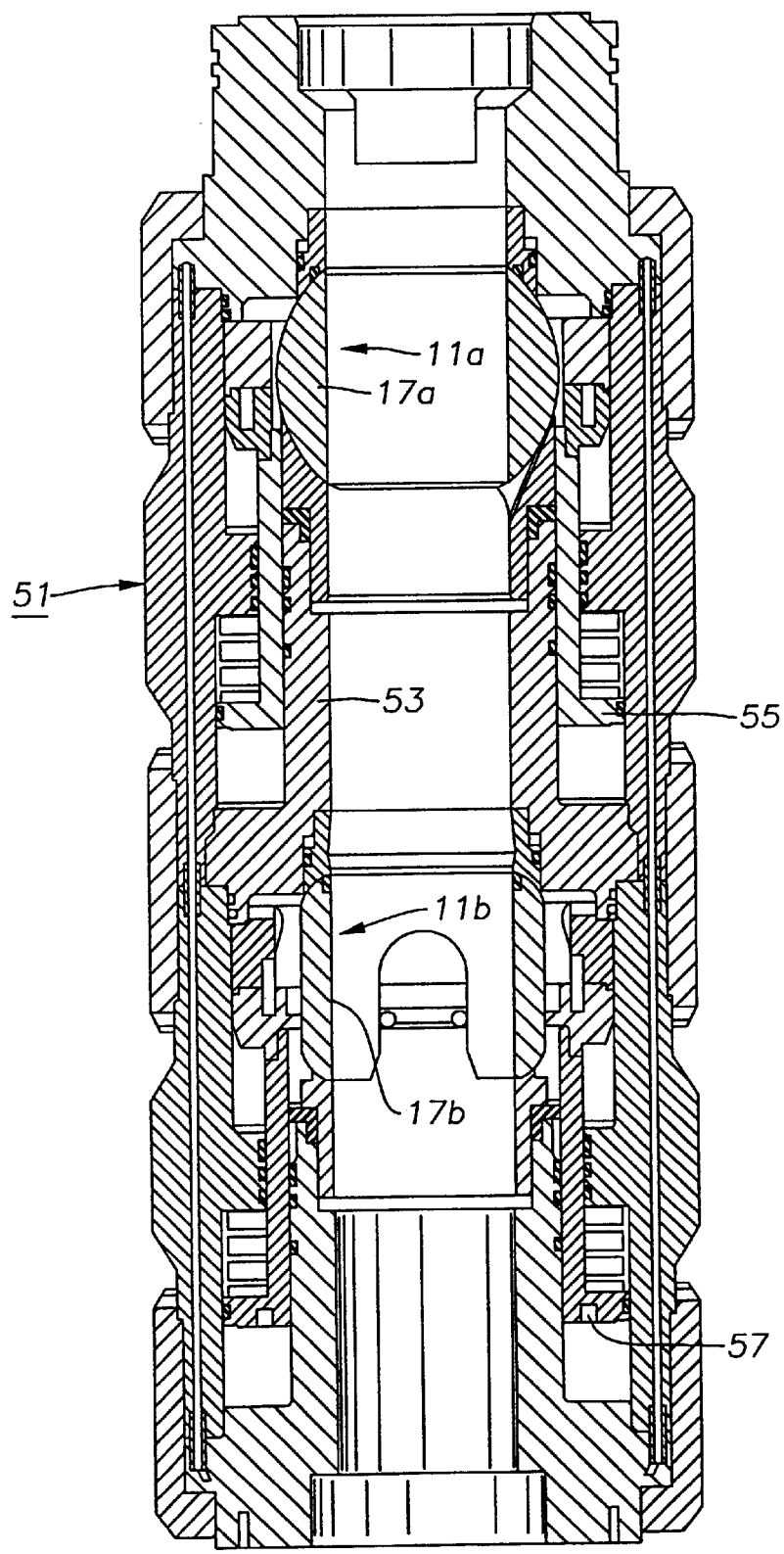
FIG. 6 is a sectional side view of a housing having two of the ball valve assemblies of FIGS. 1 and 2.

In operation (FIG. 6), a pair of co-axially aligned ball valve assemblies 11a, 11b are located in the axial bore of a tubular member such as housing 51. In the embodiment shown, upper ball valve assembly 11a has a non-shearing ball 17a, and lower ball valve assembly 11b has a shearing ball 17b, as is known in the art. Ball valve assemblies 11a, 11b, are axially spaced apart by a generally tubular spacing element 53, and are provided with independent hydraulic or mechanical actuating members 55, 57 for moving balls 17a, 17b between open positions and closed positions (not shown). Note that the present invention is applicable to all ball assemblies, regardless of whether single or multiple ball units are used.

The present invention has several advantages. The spherical ball support guides the ball on its outer surface, and encompasses the ball sufficiently to prevent lateral movement while maintaining central alignment. A relief feature in the support prevents wire line from being cut at the lower end of the support. The floating spherical seat has an encompassing skirt that prevents the rotating ball from cocking or locking up prior to full rotation to the open or closed position. The skirt is provided with grooves to improve sealing and to reduce friction by retention of lubricant. Finally, an optional insert is provided in the skirt for low pressure sealing from below and above.

While the present invention has been shown or described in only some of its forms, it should be apparent to those skilled in the art that it is not so limited, but is susceptible to various changes without departing from the scope of the invention. For example, the assembly is shown in unidirectional sealing form where sealing is normally from below. Sealing from above is possible, but structural limitations in the ball when supporting pressure from above may limit the pressure that can be sealed from above.

Full bi-directional sealing, which is always on the downstream side relative to the flow direction through the valve, could be attained by providing a seal between ball support 13, the surface of lower tubular 21, and the mating bore or inner body 53. For this configuration, the wire line clearance groove 27 would be deleted and the spherical support surface 25 could have the same grooving 37 and insert 39 option as seat 15.

What is claimed is:

1. A ball valve assembly, comprising:
   a ball having an axial hole;
   a lower support having a support surface for supporting the ball;
   an upper seat located opposite the lower support in contact with the ball;
   a pair of linkages mounted on opposite sides of the ball for rotating the ball through a range of rotation;
   an actuator axially movable relative to the lower support and the upper seat, the actuator being in engagement with the linkages for rotating the linkages;
   a pair of guide members stationarily mounted to opposite sides of the lower support extending upward alongside the linkages; and
   wherein the lower support has a partially spherical surface that contacts the ball, and wherein the assembly further comprises a recess formed on one side of the spherical surface and extending from a lower edge of the spherical surface to an upper edge of the spherical surface at an inclination relative to an axis of the assembly to prevent shearing of a line by the engagement of the ball with the spherical surface of the lower support.

2. A ball valve assembly, comprising:
   a ball having an axial hole;
   a lower support having a support surface for supporting the ball;
   an upper seat located opposite the lower support in contact with the ball;
   a pair of linkages mounted on opposite sides of the ball for rotating the ball through a range of rotation:
   an actuator axially movable relative to the lower support and the upper seat, the actuator being in engagement with the linkages for rotating the linkages;
   a pair of guide members stationarily mounted to opposite sides of the lower support and extending upward alongside the linkages;
   wherein the upper support has axially extending reliefs on opposite sides to accommodate the linkages; and
   wherein each of the guide members engages the reliefs.

3. The ball valve assembly of claim 2 wherein each of the guide members has a free upper end located adjacent to but not connected to the upper seat.

4. The ball valve assembly of claim 2 wherein the lower support and the upper seat each have sealing surfaces that sealingly engage the ball, and wherein each of the sealing surfaces comprises a plurality of concentric grooves.

5. A ball valve assembly, comprising:
   a ball having an axial hole;
   a lower support having a support surface for supporting the ball;
   an upper seat located opposite the lower support in contact with the ball;
   a pair of linkages mounted on opposite sides of the ball for rotating the ball through a range of rotation;
   an actuator axially movable relative to the lower support and the upper seat, the actuator being in engagement with the linkages for rotating the linkages;
   a pair of guide members stationarily mounted to opposite sides of the lower support and extending upward alongside the linkages; wherein:
      the upper support has substantially planar axially extending reliefs on opposite sides to accommodate the linkages;
      each of the guide members is a substantially flat member; and
      an upper portion of each of the guide members makes substantially flush contact with one of the reliefs.

6. A ball valve assembly, comprising:
   a ball having an axial hole;
   a lower support having a tubular base with an axial bore extending therethrough, and a support surface for directly contacting the ball;
   a recess in the support surface that is adapted to provide relief for a wire line during cutting operations;
   an upper seat opposite the lower support and having an axial bore and a partially spherical seat surface in contact with the ball, the seat surface having an upper edge and a lower edge;
   a pair of axially extending relief surfaces formed on opposite sides of the upper seat, the relief surfaces extending through the seat surface between the upper and lower edges, defining an upper portion of the seat surface that extends 360 degrees and two lower skirt portions that extend less than 360 degrees and are separated by the relief surfaces;

a pair of linkages mounted to opposite sides of the ball for rotating the ball relative to the lower support and the upper seat through a range of rotation;

an actuator that moves axially relative to the upper seat and the lower support and engages the linkages for rotating the linkages; and a set of parallel concentric grooves on the upper portion of the seat surface and on the skirt portions for contacting the ball, the grooves in the upper portion extending 360 degrees, and the grooves in the skirt portions extending less than 360 degrees and intersecting the relief surfaces.

7. The ball assembly of claim 6 wherein the grooves retain lubricant between the skirt and the ball to reduce friction therebetween.

8. The ball assembly of claim 6, further comprising an insert mounted to the skirt for low pressure sealing of the ball, the insert being a ring that is located on the upper portion of the seat surface above the grooves.

9. The ball assembly of claim 6, further comprising a pair of guides stationarily mounted to the lower support on opposite sides and extending upward therefrom, the guides having upper ends that are in substantial engagement with but not connected to the reliefs on the upper seat to restrain rotation of the upper seat.

10. The ball assembly of claim 6 wherein the support surface of the lower support is partially spherical and has a recess extending from a lower edge of the support surface to an upper edge of the support surface at one side of the lower support and at an inclination relative to an axis of the assembly to prevent the engagement of the ball with the lower support from shearing a line.

11. The ball assembly of claim 6, further comprising a second set of grooves located on the support surface of the lower support for full bi-directional sealing of the ball.

12. A ball valve assembly, comprising:

a housing having an axial bore;

a ball;

a support surface for supporting the ball;

a seat located opposite the support surface the seat being a partially spherical surface with substantially flat axially extending reliefs on opposite sides, the reliefs being positioned between upper and lower edges of the spherical surface, defining two skirt portions on opposite sides;

a pair of linkage members mounted on opposite sides of the ball adjacent the reliefs;

an axially movable actuator engaging the linkages to rotate the linkages and the ball; and a pair of substantially flat guide members stationarily mounted to the support surface and extending axially therefrom, the guide members being in substantially flush engagement with but not connected to the reliefs, the guide members having free upper ends that locate between the skirt portions.

13. The assembly of claim 12 further comprising a plurality of parallel concentric grooves on the spherical surface between the skirt portions and also on the skirt portions for contacting the ball.

14. The assembly of claim 12 wherein the support surface is partially spherical, having an upper edge and a lower edge, the support surface having a recess on one side that extends from the lower edge to the upper edge of the support surface at an inclination relative to an axis of the assembly to prevent the engagement of the ball with the support surface from shearing a line.

15. The sea-welt assembly of claim 12, further comprising an insert in the skirt for low pressure sealing of the ball to the seat.

16. The assembly of claim 12, further comprising a first texture on the spherical surface of the seat and a second texture on the support surface for full bi-directional sealing of the ball.

\* \* \* \* \*

UNITED STATES PATENT AND TRADEMARK OFFICE
CERTIFICATE OF CORRECTION

PATENT NO. : 6,668,933 B2 Page 1 of 1
DATED : December 30, 2003
INVENTOR(S) : Peter Michael Kent It is certified that error appears in the above-identified patent and that said Letters Patent is hereby corrected as shown below:

Column 6,
Line 33, delete "sea-welt" before "assembly"

Signed and Sealed this

Twenty-seventh Day of April, 2004

JON W. DUDAS
*Acting Director of the United States Patent and Trademark Office*